United States Patent
Yamada et al.

(10) Patent No.: US 11,145,468 B2
(45) Date of Patent: Oct. 12, 2021

(54) ELECTROLYTIC CAPACITOR

(71) Applicant: Panasonic Intellectual Property Management Co., Ltd., Osaka (JP)

(72) Inventors: Yuichiro Yamada, Osaka (JP); Masahiro Sato, Kyoto (JP); Yasuyuki Komatsu, Osaka (JP); Mikio Kobashi, Osaka (JP); Atsushi Nagatomi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 9 days.

(21) Appl. No.: 16/683,836

(22) Filed: Nov. 14, 2019

(65) Prior Publication Data
US 2020/0176192 A1 Jun. 4, 2020

(30) Foreign Application Priority Data
Nov. 30, 2018 (JP) .............................. JP2018-225736

(51) Int. Cl.
*H01G 9/012* (2006.01)
*H01G 2/04* (2006.01)
*H01G 9/10* (2006.01)

(52) U.S. Cl.
CPC ............... *H01G 9/012* (2013.01); *H01G 2/04* (2013.01); *H01G 9/10* (2013.01)

(58) Field of Classification Search
None
See application file for complete search history.

(56) References Cited

U.S. PATENT DOCUMENTS

| 7,974,077 B2 * | 7/2011 | Matsuoka | ............... H01G 9/14 361/540 |
| 8,514,550 B2 * | 8/2013 | Vyroubal | ............... H01G 9/15 361/540 |

(Continued)

FOREIGN PATENT DOCUMENTS

| JP | 2007103575 | * | 4/2007 | ............... H01G 2/24 |
| WO | 2018/131691 | | 7/2018 | |

OTHER PUBLICATIONS

Translation of JP 2007-103575 (Year: 2007).*

*Primary Examiner* — Dion Ferguson
(74) *Attorney, Agent, or Firm* — McDermott Will and Emery LLP

(57) ABSTRACT

A solid electrolytic capacitor includes a capacitor element, an anode lead frame, a cathode lead frame, and an exterior member. The capacitor element includes an anode part and a cathode part. The cathode lead frame includes a cathode mount, a cathode connection part connected to the cathode mount, and a cathode terminal connected to the cathode connection part. The cathode lead frame bends in one direction at a first boundary between the cathode mount and the cathode connection part, and further bends in another direction at a second boundary between the cathode connection part and the cathode terminal. At least one of the cathode mount and the cathode terminal has a projection at an edge of the at least one of the cathode mount and the cathode terminal. The edge is at a side close to the cathode connection part. The projection projects in a first direction along which the anode part and the cathode part are aligned.

19 Claims, 14 Drawing Sheets

(56) References Cited

U.S. PATENT DOCUMENTS

| | | | | |
|---|---|---|---|---|
| 8,582,278 B2* | 11/2013 | Zednicek | ............... | H01G 9/15 361/540 |
| 2001/0028544 A1* | 10/2001 | Sano | ............... | H01G 9/012 361/301.3 |
| 2003/0174460 A1* | 9/2003 | Sano | ............... | H01G 2/02 361/523 |
| 2007/0242409 A1* | 10/2007 | Nakamura | ............... | H01G 9/012 361/272 |
| 2008/0285209 A1* | 11/2008 | Horio | ............... | H01G 9/012 361/523 |
| 2008/0310081 A1* | 12/2008 | Shimizu | ............... | H01G 9/08 361/529 |
| 2009/0116173 A1* | 5/2009 | Shimizu | ............... | H01G 9/012 361/529 |
| 2009/0199378 A1* | 8/2009 | Chacko | ............... | H01G 2/065 29/25.03 |
| 2009/0244812 A1* | 10/2009 | Rawal | ............... | H01G 2/06 361/525 |
| 2011/0249375 A1* | 10/2011 | Matsuoka | ............... | H01G 9/14 361/528 |
| 2012/0257329 A1* | 10/2012 | Biler | ............... | H01G 4/228 361/528 |
| 2012/0293917 A1* | 11/2012 | Chen | ............... | H01G 9/15 361/524 |
| 2013/0222977 A1* | 8/2013 | Kawahito | ............... | H01G 9/10 361/523 |
| 2013/0314845 A1* | 11/2013 | Chacko | ............... | H01G 9/0425 361/502 |
| 2015/0049419 A1* | 2/2015 | Biler | ............... | H01G 9/012 361/525 |
| 2015/0092319 A1* | 4/2015 | Tatsuno | ............... | H01G 9/0003 361/525 |
| 2015/0364263 A1* | 12/2015 | Petrzilek | ............... | H01G 9/0036 361/525 |
| 2019/0333705 A1* | 10/2019 | Sato | ............... | H01G 9/042 |
| 2019/0333707 A1* | 10/2019 | Ishitani | ............... | H01G 9/26 |

* cited by examiner

ELECTROLYTIC CAPACITOR

BACKGROUND

1. Technical Field

The present disclosure relates to an electrolytic capacitor.

2. Description of the Related Art

Electrolytic capacitors are used to various electronic devices because of their low equivalent series resistance (ESR) and excellent frequency characteristics. PCT International Publication No. 2018/131691 discloses an electrolytic capacitor including a capacitor element, lead terminals, and an exterior member covering at least a part of the capacitor element. The capacitor element includes an anode body, a dielectric layer formed on the anode body, a solid electrolyte layer formed on the dielectric layer, and a cathode layer formed on the solid electrolyte layer. The lead terminals are connected to the anode body and the cathode layer, respectively, and are partly exposed from a bottom face of the exterior member.

SUMMARY

A solid electrolytic capacitor according to an aspect of the present disclosure includes a capacitor element, an anode lead frame, a cathode lead frame, and an exterior member. The capacitor element includes an anode part and a cathode part. Each of the anode lead frame and the cathode lead frame is connected to the capacitor element. The exterior member covers the capacitor element, a part of the anode lead frame, and a part of the cathode lead frame. The cathode lead frame includes a cathode mount, a cathode connection part connected to the cathode mount, and a cathode terminal connected to the cathode connection part. The cathode part is mounted on the cathode mount. The cathode lead frame bends in one direction at a first boundary between the cathode mount and the cathode connection part, and further bends in another direction at a second boundary between the cathode connection part and the cathode terminal. At least one of the cathode mount and the cathode terminal has a projection at an edge of the at least one of the cathode mount and the cathode terminal. The edge is at a side close to the cathode connection part. The projection projects in a first direction along which the anode part and the cathode part are aligned.

It is to be noted that a comprehensive or specific aspect of the present disclosure may be achieved by means of an electrolytic capacitor, a device, a system, a method, or any combination of these.

The present disclosure provides a solid electrolytic capacitor that can ensure a sufficient exposed area of the terminal while ensuring a sufficient contact area between the cathode lead frame and the cathode part.

DETAILED DESCRIPTION OF EMBODIMENT

Figure 1:
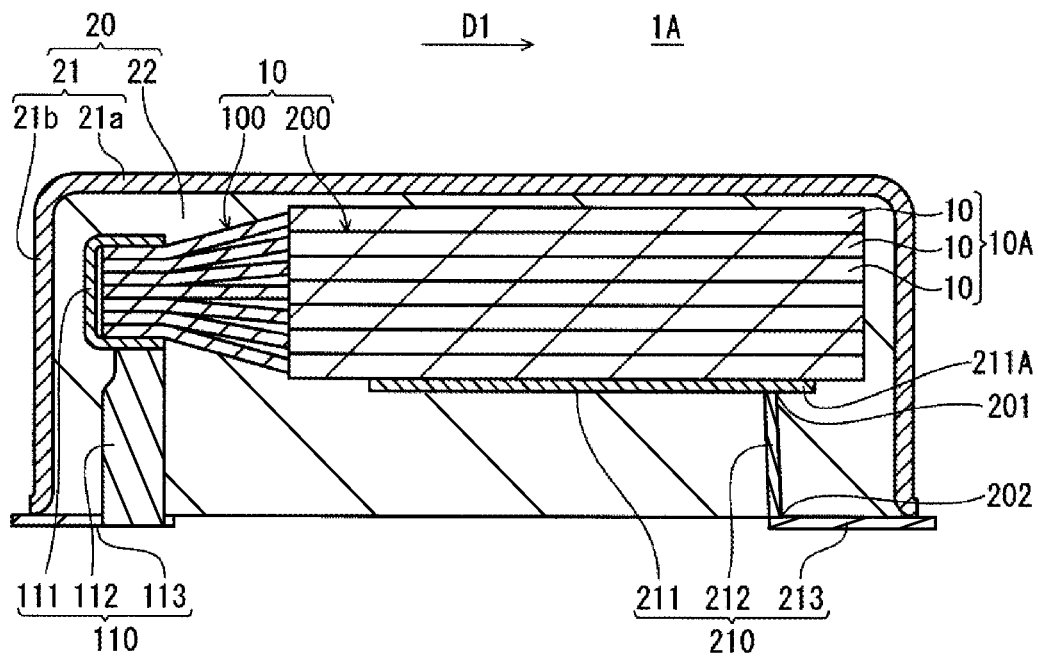
FIG. 1 is a partly sectional view schematically illustrating an electrolytic capacitor according to a first exemplary embodiment of the present disclosure.

In PCT International Publication No. 2018/131691, a cathode lead frame is bent at a plurality of positions, and a part of the cathode lead frame is used as the cathode lead terminal. In such a case, if a contact area between the cathode lead frame and the cathode layer is increased, an exposed area of the terminal is decreased. If, conversely, the exposed area of the terminal is increased, the contact area with the cathode layer is decreased.

In view of the above, an electrolytic capacitor according to the present disclosure includes a capacitor element, an anode lead frame, a cathode lead frame, and an exterior member. The capacitor element includes an anode part and a cathode part. Each of the anode lead frame and the cathode lead frame is connected to the capacitor element. The exterior member covers the capacitor element, a part of the anode lead frame, and a part of the cathode lead frame.

The cathode lead frame includes a cathode mount, a cathode connection part connected to the cathode mount, and a cathode terminal connected to the cathode connection part. The cathode part is mounted on the cathode mount. Here, the cathode part is joined to the cathode mount. Structurally, the cathode lead frame bends in one direction at a first boundary between the cathode mount and the cathode connection part, and further bends in another direction at a second boundary between the cathode connection part and the cathode terminal. In other words, the cathode lead frame may be integrally formed from a foil piece of predetermined shape that is cut out of a single sheet of metal foil.

At least one of the cathode mount and the cathode terminal has a projection projecting from a position of the cathode connection part in a first direction along which the anode part and the cathode part are aligned. In other words, the at least one of the cathode mount and the cathode terminal has, at an edge of the at least one of the cathode mount and the cathode terminal which is close to the cathode connection part, the projection projecting in the first direction along which the anode part and the cathode part are aligned. The first direction along which the anode part and the cathode part are aligned means, for example, a direction extending from an anode terminal to the cathode terminal or a direction extending from the cathode terminal to the anode terminal.

The projection means an overhanging part of the at least one of the cathode mount and the cathode terminal with respect to the cathode connection part in the first direction. With the projection, an area of the at least one of the cathode mount and the cathode terminal can be increased. Due to the presence of the projection, a sufficient exposed area of the terminal (i.e., a sufficient exposed area of the cathode terminal) can be ensured while ensuring a sufficient contact area between the cathode lead frame and the cathode part (i.e., a sufficient area of the cathode mount). In this way, resistance of the electrolytic capacitor can easily be decreased. Moreover, mounting strength (i.e., connection strength) of the electrolytic capacitor with respect to a substrate can be improved.

In a second direction that intersects the first direction of the cathode lead frame, a dimension (width) of the cathode connection part may be smaller than at least one of a dimension (width) of the cathode mount and a dimension (width) of the cathode terminal. The second direction intersecting the first direction means, for example, a direction intersecting the first direction at an angle ranging from 80° to 100°, inclusive, and is preferably a direction intersecting the first direction approximately at 90°. In cases where the cathode connection part is constituted by a plurality of parts divided in the second direction, the dimension of the cathode connection part is defined to be a sum of dimensions of these parts in the second direction. If the dimension of the cathode connection part is not uniform along the first direction, the dimension of the cathode connection part is defined to be a maximum dimension of the cathode connection part.

By decreasing the dimension (width) of the cathode connection part, bending of the cathode lead frame can be facilitated. When, for example, the cathode lead frame is formed from the foil piece cut out of the single sheet of metal foil by using a die, a finished article can easily be removed from the die. It is to be noted, however, that the dimension of the cathode connection part can be equal to the at least one of the dimension of the cathode mount and the dimension of the cathode terminal.

The capacitor element has a first principal surface, a second principal surface opposite to the first principal surface, and a peripheral side surface intersecting the first principal surface. The first principal surface has approximately rectangular shape and is joined to the cathode mount. The peripheral side surface includes a third principal surface positioned near the anode part in the first direction, a fourth principal surface positioned near the cathode part in the first direction, a fifth principal surface positioned at one side in the second direction, and a sixth principal surface positioned at the other side in the second direction.

In cases where the cathode mount has the projection, the cathode mount may include a side wall part that is disclosed along the peripheral side surface of the capacitor element. The side wall part serves to position the capacitor element and contributes to increase of the area of connection between the cathode mount and the cathode part. The peripheral side surface of the capacitor element is a surface parallel to a thickness direction that connects between the two principal surfaces of the capacitor element. In cases where, for example, a plurality of the capacitor elements is stacked to form a layered body, the peripheral side surface of the capacitor element is a surface parallel to a stacking direction.

The side wall part may be at least partly connected to the projection of the cathode mount. In that case, the side wall part is preferably provided as close to an edge of the cathode mount as possible. In this way, it is easily designed that a space to accommodate the side wall part is minimized. Consequently, a volume of the capacitor element can be increased so that capacitance of the electrolytic capacitor can be improved. The side wall part may be provided, for example, along the fifth principal surface as well as along the sixth principal surface of the capacitor element or may be provided along the fourth principal surface of the capacitor element.

Although not limited to a particular outline, an outline of the cathode mount in planer view has, for example, a protruding shape or a recessed shape. If the outline of the cathode mount has such a shape, the projection can easily be designed to become large.

Although not limited to a particular outline, an outline of the cathode terminal in planer view has, for example, a protruding shape or a recessed shape. If the outline of the cathode terminal has such a shape, the projection can easily be designed to become large.

According to a preferred aspect, the exterior member includes a metal case having an opening and a sealing member filling the metal case. The capacitor element is housed in the metal case and covered by the sealing member. In this case, at least a part of the cathode terminal may be exposed from the sealing member at a position close to the opening of the metal case. Similarly, at least a part of the anode terminal may be exposed from the sealing member at a position close to the opening of the metal case. It is to be noted that as an example of the sealing member, a liquid resin composition including a thermosetting resin is used. With the dimension of the cathode connection part being smaller than the at least one of the dimension of the cathode mount and the dimension of the cathode terminal, the sealing member easily flows into a space between the capacitor element and the cathode terminal when the metal case is filled with the sealing member. That causes few air bubbles remain in the sealing member.

It is preferable that shortest distance L1 between a metal-case-opening-end surface of the sealing member and the capacitor element is as long as possible within a permissible range of miniaturization demanded of the electrolytic capacitor. Shortest distance L1 may be, for example, more than or equal to 5% of a depth of the metal case. Taking into consideration the demand for miniaturization of the electrolytic capacitor, shortest distance L1 may be less than or equal to 80% of the depth of the metal case. It is preferable that shortest distance L2 between a top plate of the metal case and the capacitor element is as small as possible. Shortest distance L2 may be less than or equal to 50% of the depth of the metal case, may be less than or equal to 30% of the depth of the metal case or may be less than or equal to 10% of the depth of the metal case. The above design can easily provide the electrolytic capacitor that is unsusceptible to outside air or moisture and also meets the demand for miniaturization.

The following description is provided with reference to the drawings that are illustrative only, so that illustrated examples are not restrictive of contents of the present disclosure.

First Exemplary Embodiment

FIG. 1 is a partly sectional view schematically illustrating electrolytic capacitor 1A according to a first exemplary embodiment of the present disclosure. In this figure, sectional views of exterior member 20, anode joint 111, and cathode mount 211 are illustrated.

Electrolytic capacitor 1A according to the present exemplary embodiment includes capacitor elements 10 that each include anode part 100 and cathode part 200, anode lead frame 110 connected to capacitor elements 10, cathode lead frame 210 connected to capacitor element 10, and exterior member 20. Exterior member 20 covers capacitor element 10, a part of anode lead frame 110, and a part of cathode lead frame 210. It is to be noted that the plurality of capacitor elements 10 are stacked to form layered body 10A. Capacitor elements 10 that are stacked are not particularly limited in number. Exterior member 20 includes case 21 and sealing member 22 that fills case 21 and covers capacitor elements 10.

Although not limited to a particular shape, case 21 has, for example, approximately rectangular cup shape. Case 21 includes top plate 21a and peripheral wall 21b. Case 21 may be made of, for example, a ceramic material. Alternatively, case 21 may be formed, for example, by drawing a metal sheet. In that case, a given insulation member may be provided as described in a sixth exemplary embodiment.

Sealing member 22 is filled into a space between capacitor elements 10 and case 21 to cover a periphery of capacitor elements 10. An external surface of sealing member 22, anode terminal 113, and cathode terminal 213 are exposed at a bottom face of electrolytic capacitor 1A.

Sealing member 22 is nonconductive and includes, for example, a cured product of thermosetting resin. Examples of the thermosetting resin include epoxy resin, phenol resin, silicone resin, melamine resin, urea resin, alkyd resin, polyurethane, polyimide, polyamide-imide, and unsaturated polyester, and the like. Sealing member 22 prevents outside air or moisture from penetrating into an interior of electrolytic capacitor 1A, thus suppressing deterioration of capacitor elements 10.

Anode lead frame 110 includes anode joint 111 joined to anode parts 100, anode connection part 112 connected to anode joint 111, and anode terminal 113 connected to anode connection part 112. In the illustrated example, anode connection part 112 rises toward anode parts 100 from anode terminal 113, which is disposed at the bottom face of electrolytic capacitor 1A, to connect with anode joint 111. Anode joint 111 holds the plurality of stacked anode parts 100 in a collective manner. Anode joint 111 is fastened to anode parts 100 when pressure is applied to anode joint 111 in a thickness direction of anode part 100. Anode lead frame 110 can be formed by bending, by means of a die or the like, a foil piece cut out of a single sheet of metal foil.

It is to be noted that anode lead frame 110 may be electrically connected to anode parts 100 via an electrically conductive adhesive or solder. Alternatively, anode lead frame 110 may be joined to anode parts 100 by resistance welding or laser welding.

A material for anode lead frame 110 is not particularly limited as long as the material is electrochemically and chemically stable and has electric conductivity. The material for anode lead frame 110 may be metal or nonmetal. Further, anode lead frame 110 is not limited to a particular shape. In view of downsizing in height, a thickness of anode lead frame 110 preferably ranges from 25 μm to 200 μm, inclusive, and more preferably ranges from 25 μm to 100 μm, inclusive.

Cathode lead frame 210 includes cathode mount 211 on which cathode part 200 is mounted, cathode connection part 212 connected to cathode mount 211, and cathode terminal 213 connected to cathode connection part 212. Cathode lead frame 210 bends in one direction at first boundary 201 between cathode mount 211 and cathode connection part 212, and further bends in another direction at second boundary 202 between cathode connection part 212 and cathode terminal 213. Cathode lead frame 210 can be formed by bending, by means of a die or the like, a foil piece cut out of a single sheet of metal foil.

A material for cathode lead frame 210 is also not particularly limited as long as the material is electrochemically and chemically stable and has electric conductivity. The material for cathode lead frame 210 may be metal or nonmetal. Further, cathode lead frame 210 is not limited to a particular shape. In view of downsizing in height, a thickness of cathode lead frame 210 preferably ranges from 25 μm to 200 μm, inclusive, and more preferably ranges from 25 μm to 100 μm, inclusive. Cathode lead frame 210 is electrically connected to cathode part 200 via an electrically conductive adhesive, for example.

Cathode mount 211 includes projections 211A projecting in first direction D1 (here in a direction from cathode mount 211 toward cathode connection part 212) along which anode part 100 and cathode part 200 are aligned. Consequently, projections 211A overhang in first direction D1 with respect to cathode connection part 212. Hence, an area of cathode mount 211 is enlarged by an area equivalent to projections 211A.

Figure 2:
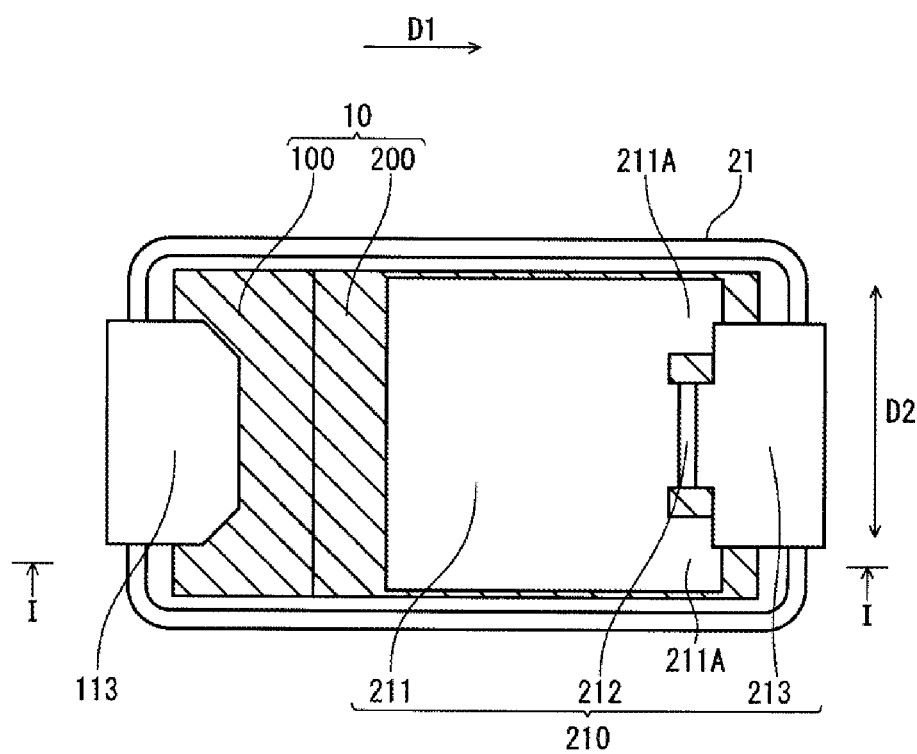
FIG. 2 is a schematic view illustrating lead frames and a capacitor element, as seen from a bottom face of the electrolytic capacitor according to the first exemplary embodiment with a sealing member removed.
Figure 3:
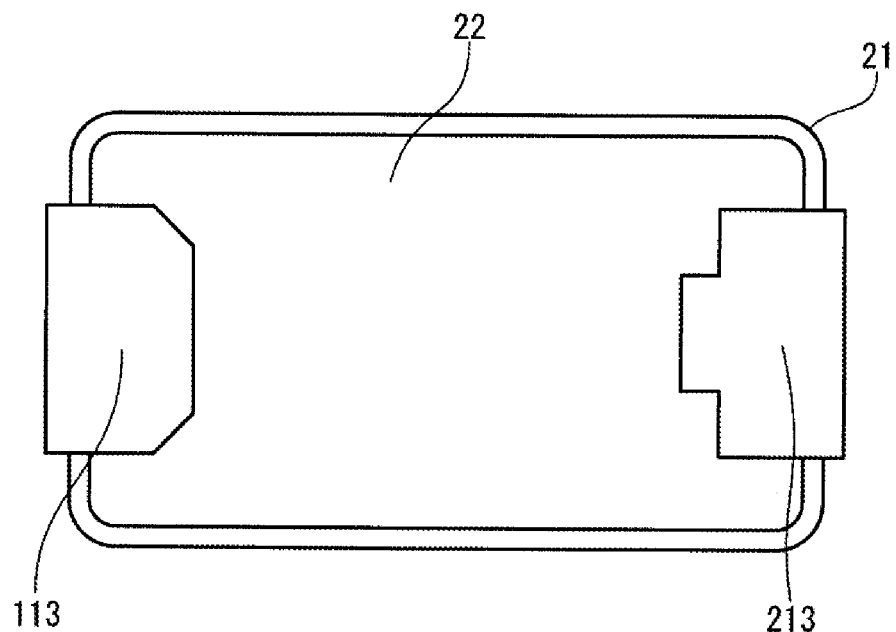
FIG. 3 is a schematic view illustrating the bottom face of the electrolytic capacitor including the sealing member used for sealing according to the first exemplary embodiment.

FIG. 2 is a schematic view illustrating lead frames 110, 210 and capacitor element 10, as seen from the bottom face of electrolytic capacitor 1A (that is to say, from an opening of cup-shaped case 21) of FIG. 1 with sealing member 22 removed. FIG. 1 corresponds to a sectional view taken along line I-I of FIG. 2. FIG. 3 is a schematic view illustrating the bottom face of electrolytic capacitor 1A of FIG. 1 with sealing member 22 used for sealing. In second direction D2 of cathode lead frame 210, which intersects first direction D1 at an angle of approximately 90°, a dimension (width) of cathode connection part 212 is smaller than a dimension (width) of cathode mount 211 and a dimension (width) of cathode terminal 213. An outline of cathode mount 211 has an approximately recess shape. Hence, cathode mount 211 has two projections 211A according with the recessed shape. Meanwhile, an outline of cathode terminal 213 has a protruding shape. When seen from the bottom face of electrolytic capacitor 1A, cathode terminal 213 partly overlaps with each of projections 211A. The larger an overlapping area of cathode terminal 213 and each of projections 211A is, the more efficiently each of an area of cathode mount 211 and an area of cathode terminal 213 can be enlarged.

Figure 4:
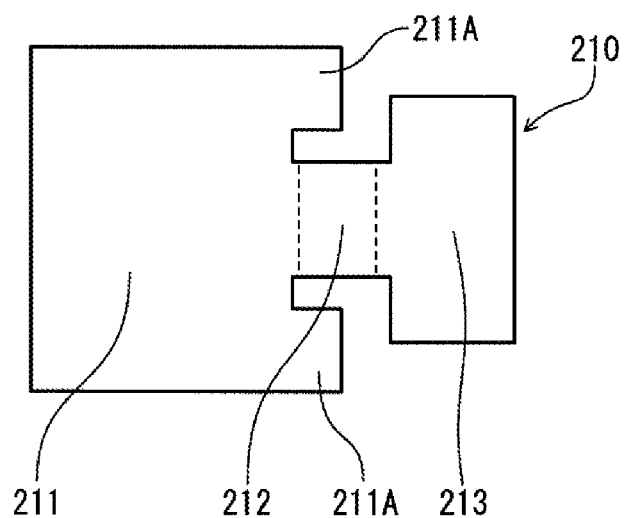
FIG. 4 is a developed view illustrating the cathode lead frame according to the first exemplary embodiment.

FIG. 4 is a developed view illustrating cathode lead frame 210 before bending. Cathode mount 211 has a recess portion. And cathode connection part 212 whose width is smaller than a width of the recess portion is extended from a central part of the recess portion. Cathode connection part 212 is connected to a projection that cathode terminal 213 has.

Parts identical or corresponding to those in the first exemplary embodiment hereinafter have the same reference characters.

Second Exemplary Embodiment

Figure 5:
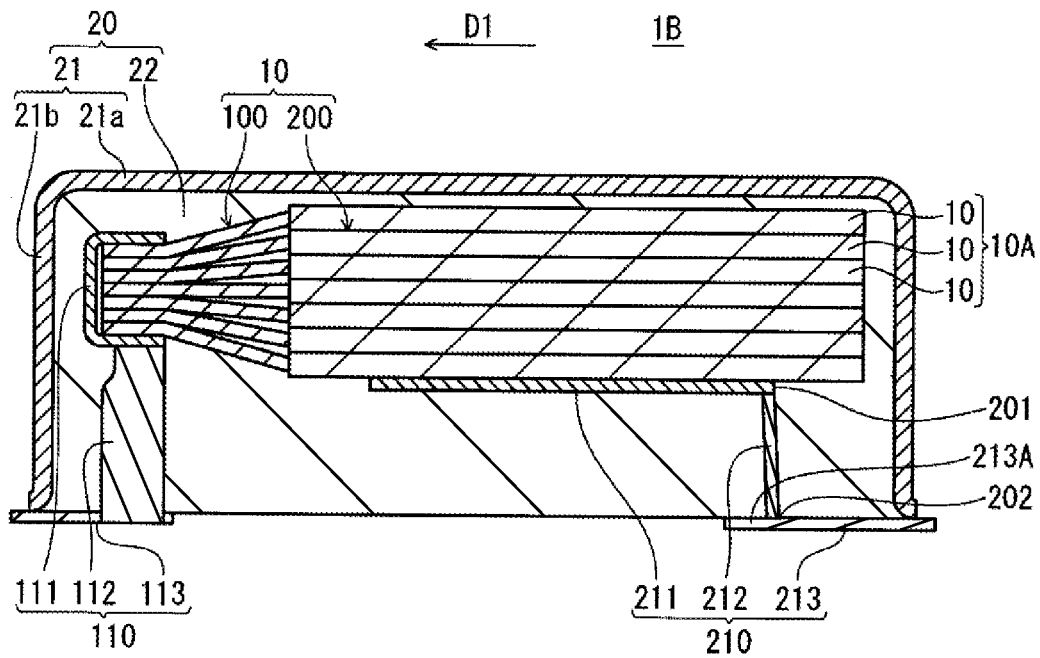
FIG. 5 is a partly sectional view schematically illustrating an electrolytic capacitor according to a second exemplary embodiment of the present disclosure.

FIG. 5 is a partly sectional view schematically illustrating electrolytic capacitor 1B according to a second exemplary embodiment of the present disclosure. The present exemplary embodiment has structures identical to those in the first exemplary embodiment except for structure of cathode lead frame 210.

Cathode terminal 213 of cathode lead frame 210 includes projections 213A projecting in first direction D1 (here in a direction from cathode terminal 213 toward cathode connection part 212) along which anode part 100 and cathode part 200 are aligned. Consequently, projections 213A overhang in first direction D1 with respect to cathode connection part 212. Hence, an area of cathode terminal 213 is enlarged by an area equivalent to projections 213A. Further, an area of cathode mount 211 is also enlarged according with respective overhang lengths of projections 213A with respect to cathode connection part 212.

Figure 6:
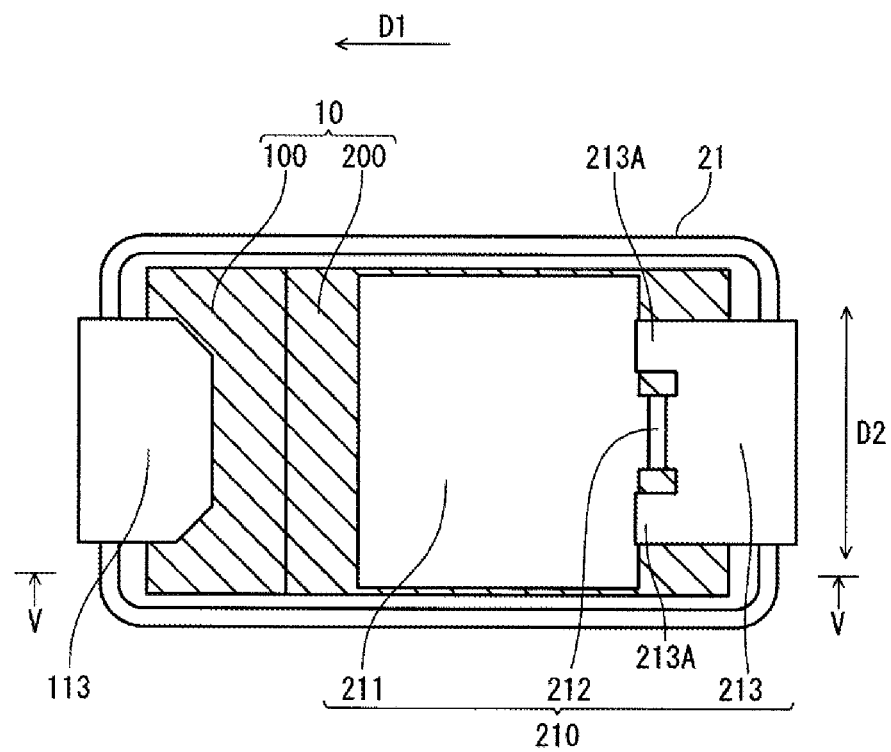
FIG. 6 is a schematic view illustrating lead frames and a capacitor element, as seen from a bottom face of the electrolytic capacitor according to the second exemplary embodiment with a sealing member removed.
Figure 7:
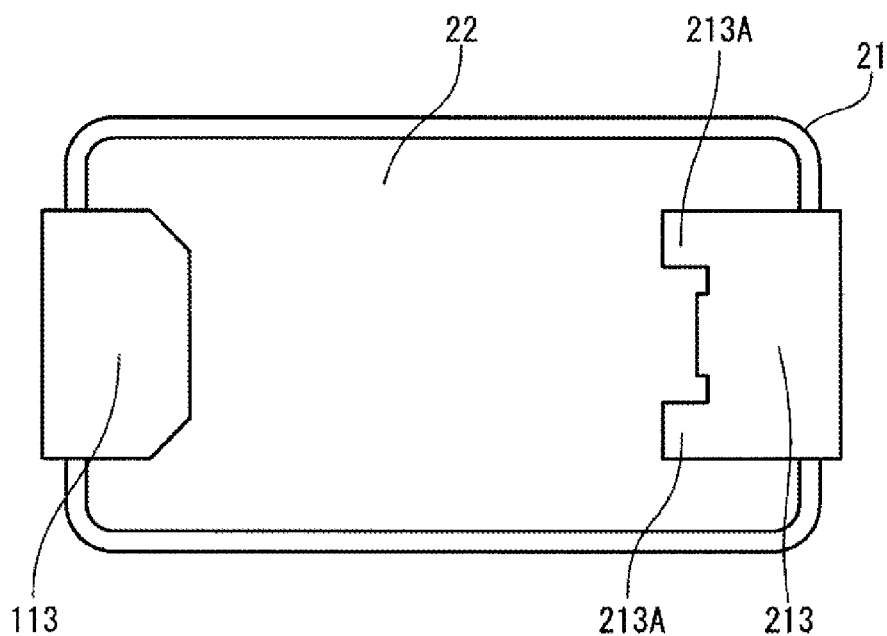
FIG. 7 is a schematic view illustrating the bottom face of the electrolytic capacitor including the sealing member used for sealing according to the second exemplary embodiment.

FIG. 6 is a schematic view illustrating lead frames 110, 210 and capacitor element 10, as seen from a bottom face of electrolytic capacitor 1B of FIG. 5 with sealing member 22 removed. FIG. 5 corresponds to a sectional view taken along line V-V of FIG. 6. FIG. 7 is a schematic view illustrating the bottom face of electrolytic capacitor 1B of FIG. 5 with sealing member 22 used for sealing. In second direction D2 of cathode lead frame 210, which intersects first direction D1 at an angle of approximately 90°, a dimension (width) of cathode connection part 212 is smaller than a dimension (width) of cathode mount 211 and a dimension (width) of cathode terminal 213. An outline of cathode terminal 213 has an approximately recessed shape. Hence, cathode terminal 213 has two projections 213A according with the recessed shape. Meanwhile, an outline of cathode mount 211 has an approximately protruding shape. When seen from the bottom face of electrolytic capacitor 1B, cathode mount 211 partly overlaps with each of projections 213A. The larger an overlapping area of cathode mount 211 and each of projections 213A is, the more efficiently each of an area of cathode mount 211 and an area of cathode terminal 213 can be enlarged.

Figure 8:
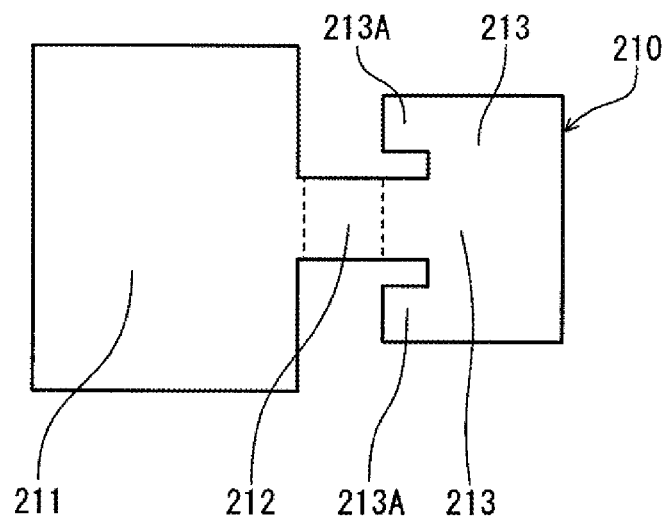
FIG. 8 is a developed view illustrating the cathode lead frame according to the second exemplary embodiment.

FIG. 8 is a developed view illustrating cathode lead frame 210 before bending. Cathode terminal 213 has a recess portion. And cathode connection part 212 whose width is smaller than a width of the recess portion is extended from a central part of the recess portion. Cathode connection part 212 is connected to a projection that cathode mount 211 has.

Third Exemplary Embodiment

Figure 9:
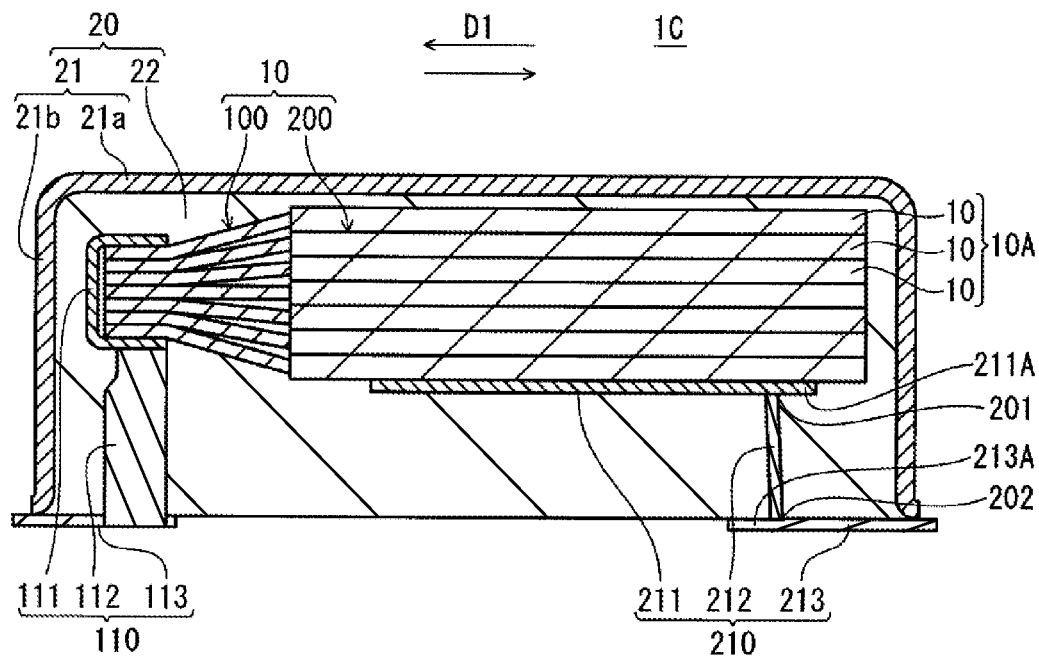
FIG. 9 is a partly sectional view schematically illustrating an electrolytic capacitor according to a third exemplary embodiment of the present disclosure.

FIG. 9 is a partly sectional view schematically illustrating electrolytic capacitor 1C according to a third exemplary embodiment of the present disclosure. The present exemplary embodiment has structures identical to those in the first exemplary embodiment except for structure of cathode lead frame 210.

Cathode mount 211 of cathode lead frame 210 includes projections 211A projecting in first direction D1 (here in a direction from cathode mount 211 toward cathode connection part 212) along which anode part 100 and cathode part 200 are aligned. Consequently, projections 211A overhang in first direction D1 with respect to cathode connection part 212. Hence, an area of cathode mount 211 is enlarged by an area equivalent to projections 211A.

Additionally, cathode terminal 213 includes projections 213A projecting in first direction D1 (here in a direction from cathode terminal 213 toward cathode connection part 212) along which anode part 100 and cathode part 200 are aligned. Consequently, projections 213A also overhang in first direction D1 with respect to cathode connection part 212. Hence, an area of cathode terminal 213 is enlarged by an area equivalent to projections 213A.

Figure 10:
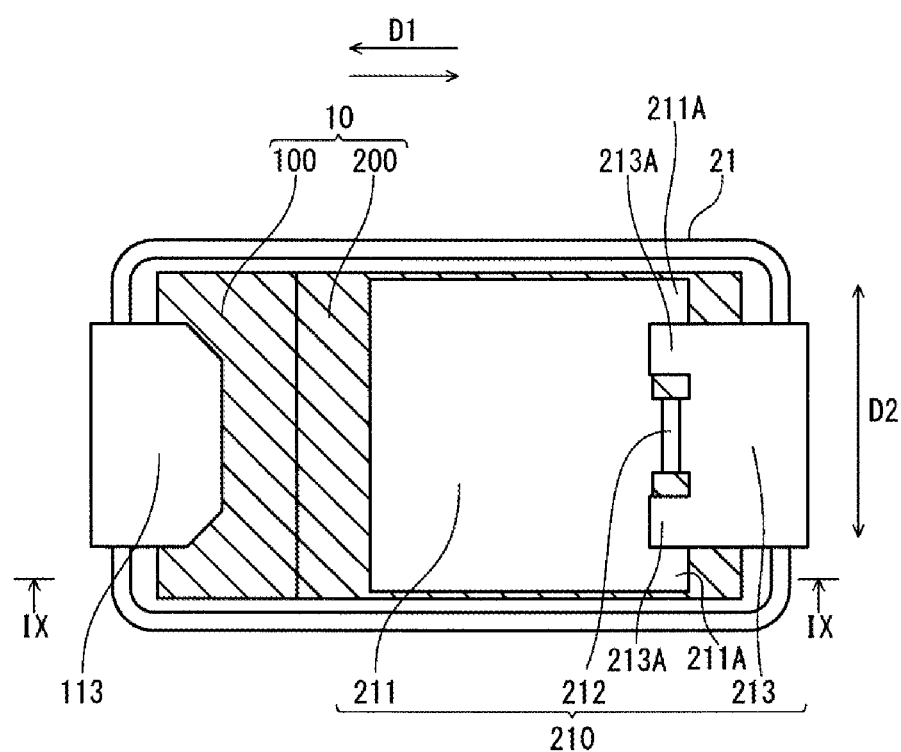
FIG. 10 is a schematic view illustrating lead frames and a capacitor element, as seen from a bottom face of the electrolytic capacitor according to the third exemplary embodiment with a sealing member removed.
Figure 11:
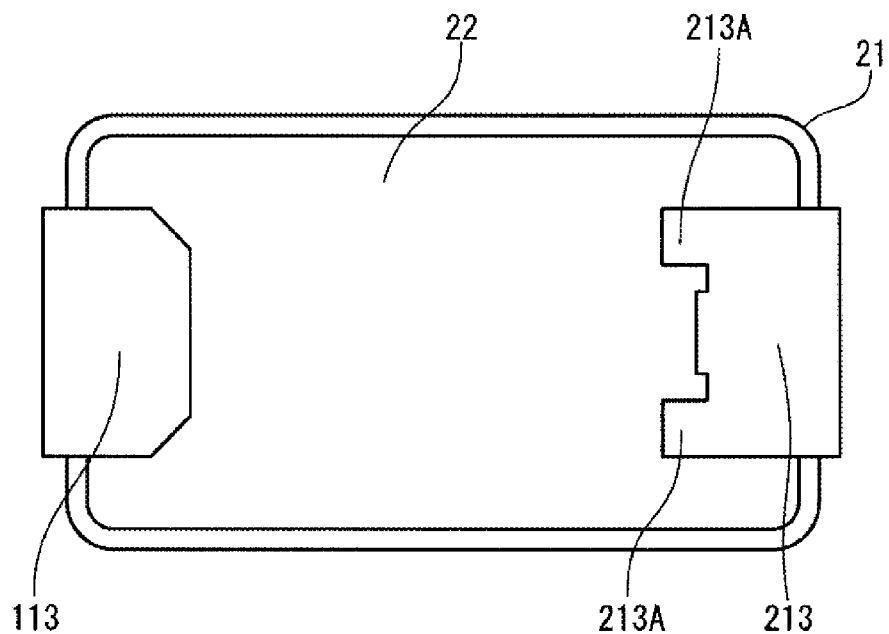
FIG. 11 is a schematic view illustrating the bottom face of the electrolytic capacitor including the sealing member used for sealing according to the third exemplary embodiment.

FIG. 10 is a schematic view illustrating lead frames 110, 210 and capacitor element 10, as seen from a bottom face of electrolytic capacitor 1C of FIG. 9 with sealing member 22 removed. FIG. 9 corresponds to a sectional view taken along line IX-IX of FIG. 10. FIG. 11 is a schematic view illustrating the bottom face of electrolytic capacitor 1C of FIG. 9 with sealing member 22 used for sealing. In second direction D2 of cathode lead frame 210, which intersects first directions D1 at an angle of approximately 90°, a dimension (width) of cathode connection part 212 is smaller than a dimension (width) of cathode mount 211 and a dimension (width) of cathode terminal 213. An outline of cathode mount 211 and an outline of cathode terminal 213 each have an approximately recessed shape. Hence, cathode mount 211 has two projections 211A according with the recessed shape, and cathode terminal 213 has two projections 213A according with the recessed shape. When seen from the bottom face of electrolytic capacitor 1C, cathode mount 211 and cathode terminal 213 partly overlap each other. The larger an overlapping area of cathode mount 211 and cathode terminal 213 is, the more efficiently each of an area of cathode mount 211 and an area of cathode terminal 213 can be enlarged. The present exemplary embodiment is superior to the first and second exemplary embodiments in that the overlapping area is large.

Figure 12:
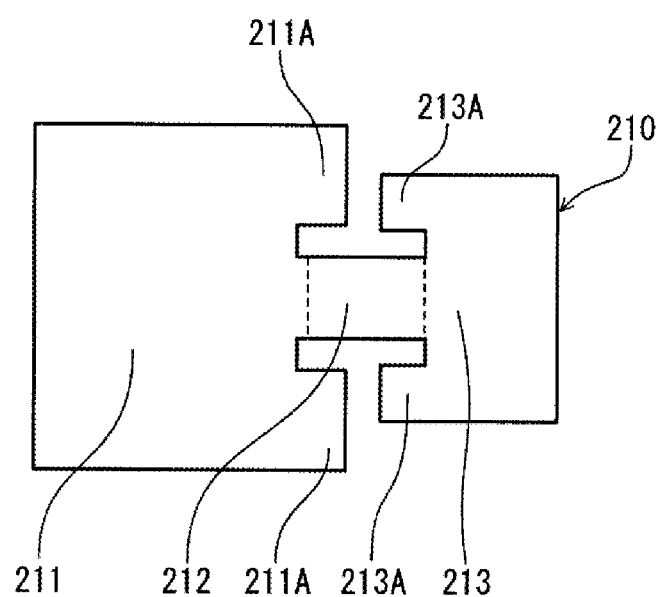
FIG. 12 is a developed view illustrating the cathode lead frame according to the third exemplary embodiment.

FIG. 12 is a developed view illustrating cathode lead frame 210 before bending. Each of cathode mount 211 and cathode terminal 213 has a recess portion. And cathode connection part 212 whose width is smaller than widths of respective recess portions of cathode mount 211 and cathode terminal 213 is provided as an extension between respective central parts of the recess portions.

Fourth Exemplary Embodiment

Figure 13:
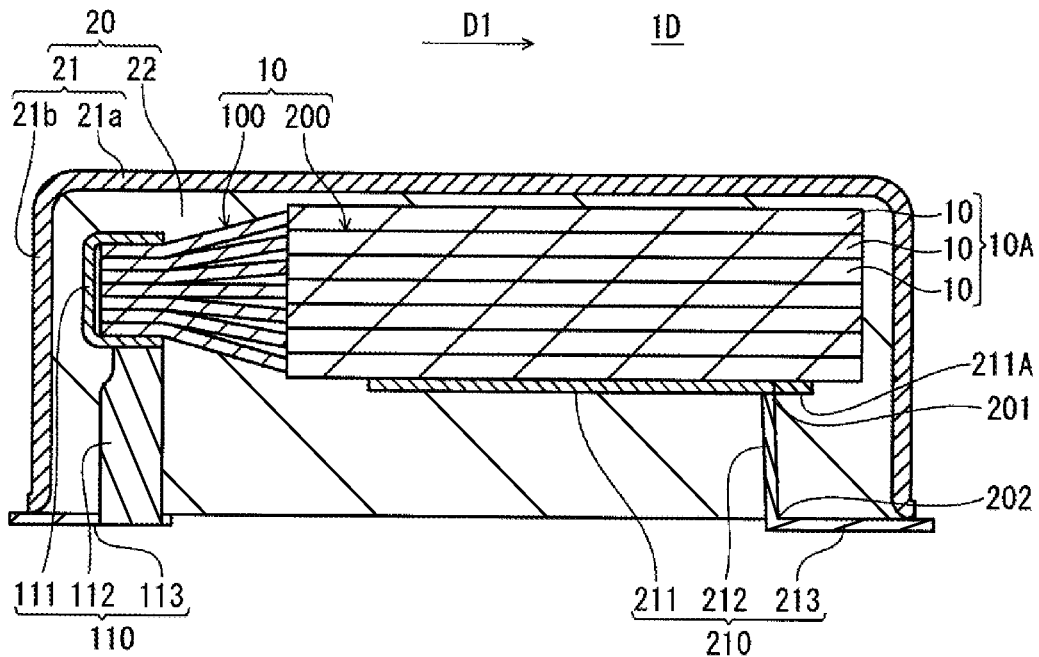
FIG. 13 is a partly sectional view schematically illustrating an electrolytic capacitor according to a fourth exemplary embodiment of the present disclosure.

FIG. 13 is a partly sectional view schematically illustrating electrolytic capacitor 1D according to a fourth exemplary embodiment of the present disclosure. The present exemplary embodiment has structures identical to those in the first exemplary embodiment except for structure of cathode lead frame 210.

Cathode mount 211 of cathode lead frame 210 includes projection 211A projecting in first direction D1 (here in a direction from cathode mount 211 toward cathode connection parts 212) along which anode part 100 and cathode part 200 are aligned. Consequently, projection 211A overhangs in first direction D1 with respect to cathode connection parts 212. Hence, an area of cathode mount 211 is enlarged by an area equivalent to projection 211A.

Figure 14:
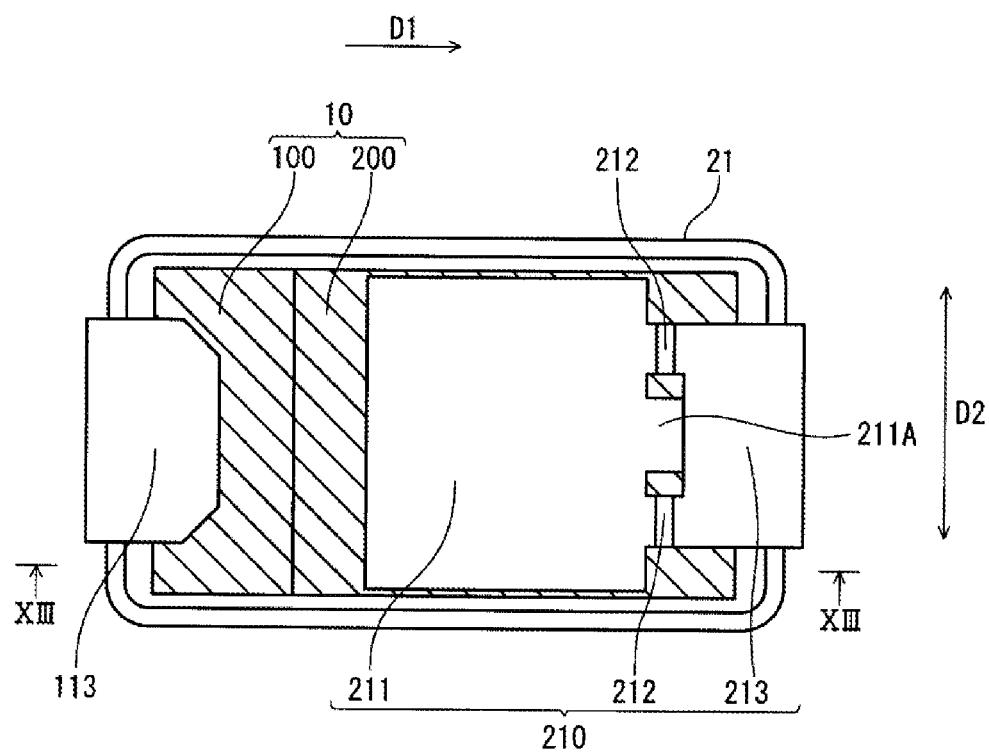
FIG. 14 is a schematic view illustrating lead frames and a capacitor element, as seen from a bottom face of the electrolytic capacitor according to the fourth exemplary embodiment with a sealing member removed.
Figure 15:
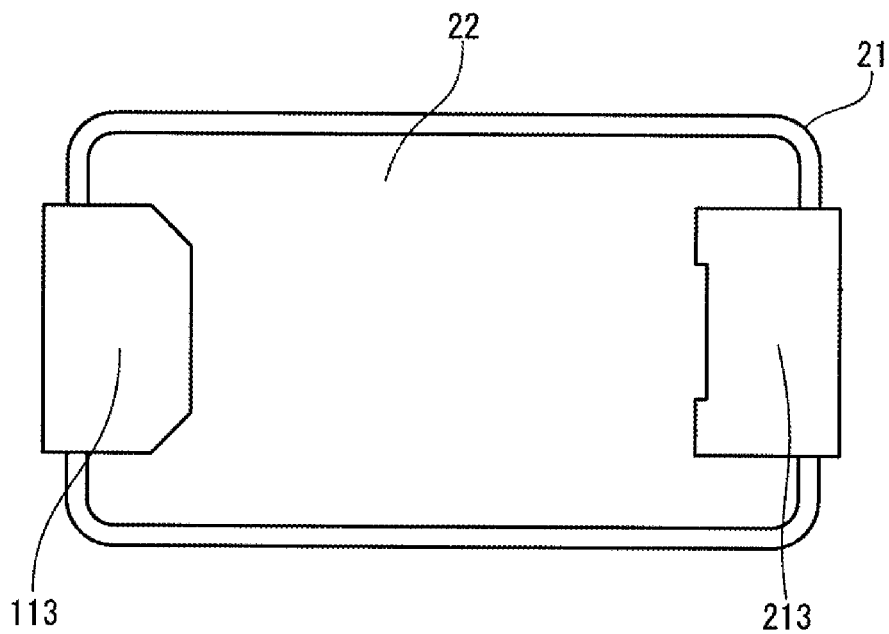
FIG. 15 is a schematic view illustrating the bottom face of the electrolytic capacitor including the sealing member used for sealing according to the fourth exemplary embodiment.

FIG. 14 is a schematic view illustrating lead frames 110, 210 and capacitor element 10, as seen from a bottom face of electrolytic capacitor 1D of FIG. 13 with sealing member 22 removed. FIG. 13 corresponds to a sectional view taken along line XIII-XIII of FIG. 14. FIG. 15 is a schematic view illustrating the bottom face of electrolytic capacitor 1D of FIG. 13 with sealing member 22 used for sealing. In second direction D2 of cathode lead frame 210, which intersects first direction D1 at an angle of approximately 90°, a dimension (width) of cathode connection parts 212 is smaller than a dimension (width) of cathode mount 211 and a dimension (width) of cathode terminal 213. It is to be noted here that cathode connection parts 212 are constituted by two parts. Thus, the dimension (width) of cathode connection parts 212 is a sum of the dimensions (widths) of these two parts in second direction D2.

An outline of cathode mount 211 has an approximately protruding shape. Hence, cathode mount 211 has one projection 211A according with the protruding shape. Meanwhile, an outline of cathode terminal 213 has an approximately recessed shape. When seen from the bottom face of electrolytic capacitor 1D, cathode terminal 213 partly overlaps with projection 211A.

Figure 16:
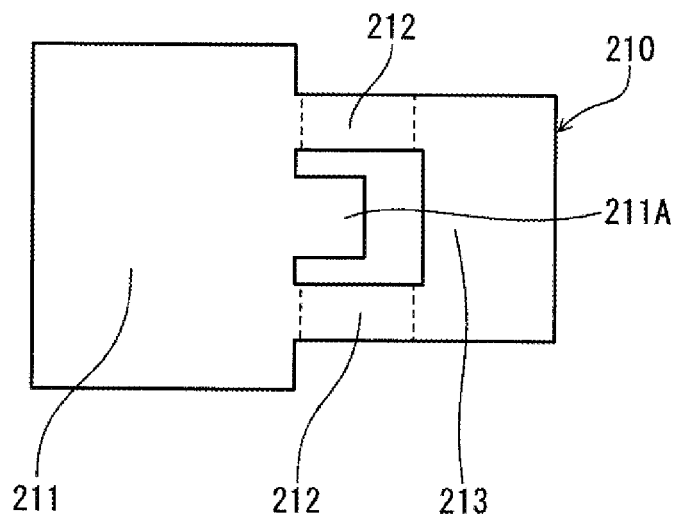
FIG. 16 is a developed view illustrating the cathode lead frame according to the fourth exemplary embodiment.

FIG. 16 is a developed view illustrating cathode lead frame 210 before bending. Cathode mount 211 has a projection portion. And a pair of cathode connection parts 212, which each have small width, are extended from respective two sites sandwiching projection 211A in cathode mount 211 to be connected to cathode terminal 213. In other words, cathode connection parts 212 are formed by providing a hole having a recess toward cathode terminal 213 in a region between cathode mount 211 and cathode terminal 213 of cathode lead frame 210.

Fifth Exemplary Embodiment

Figure 17:
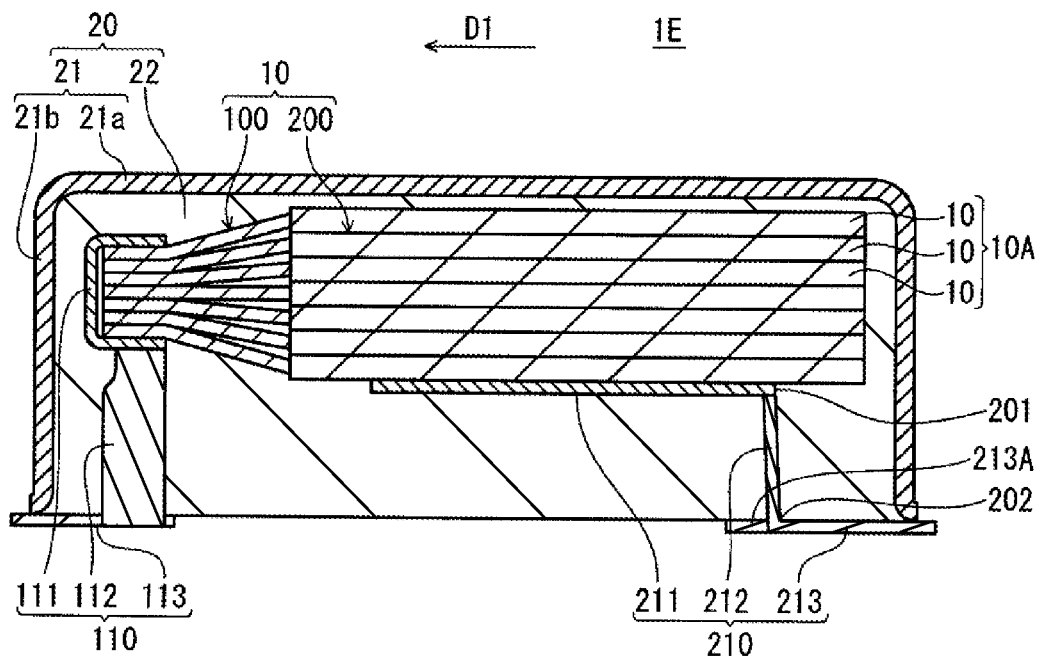
FIG. 17 is a partly sectional view schematically illustrating an electrolytic capacitor according to a fifth exemplary embodiment of the present disclosure.

FIG. 17 is a partly sectional view schematically illustrating electrolytic capacitor 1E according to a fifth exemplary embodiment of the present disclosure. The present exemplary embodiment has structures identical to those in the first exemplary embodiment except for structure of cathode lead frame 210.

Cathode terminal 213 of cathode lead frame 210 includes projection 213A projecting in first direction D1 (here in a direction from cathode terminal 213 toward cathode connection parts 212) along which anode part 100 and cathode part 200 are aligned. Consequently, projection 213A overhangs in first direction D1 with respect to cathode connection parts 212. Hence, an area of cathode terminal 213 is enlarged by an area equivalent to projection 213A.

Figure 18:
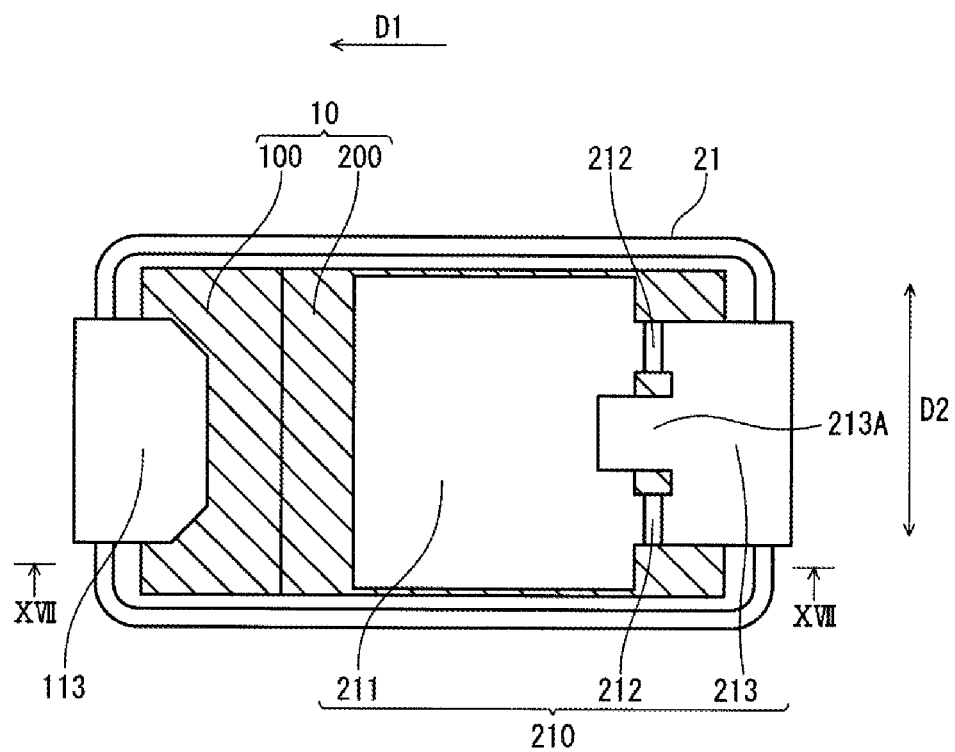
FIG. 18 is a schematic view illustrating lead frames and a capacitor element, as seen from a bottom face of the electrolytic capacitor according to the fifth exemplary embodiment with a sealing member removed.
Figure 19:
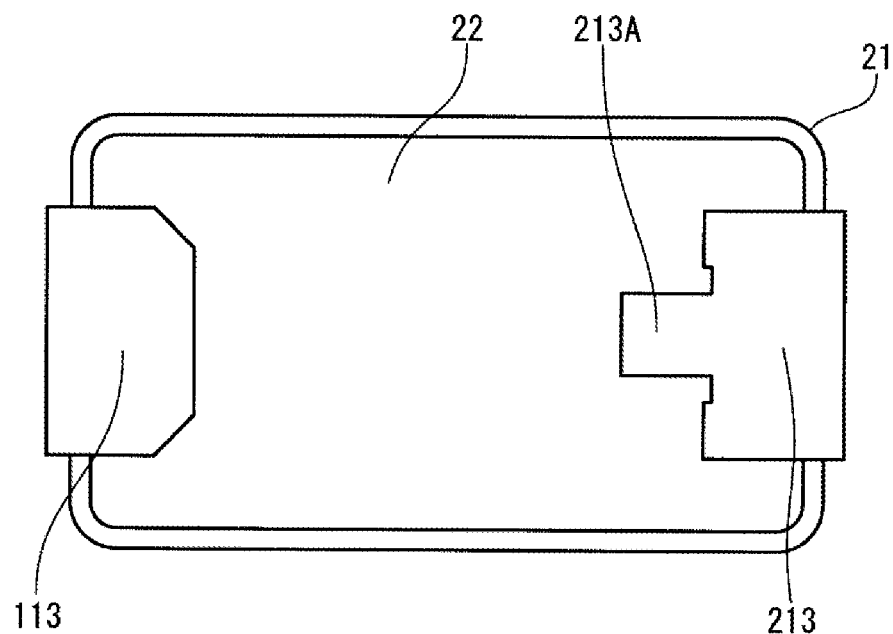
FIG. 19 is a schematic view illustrating the bottom face of the electrolytic capacitor including the sealing member used for sealing according to the fifth exemplary embodiment.

FIG. 18 is a schematic view illustrating lead frames 110, 210 and capacitor element 10, as seen from a bottom face of electrolytic capacitor 1E of FIG. 17 with sealing member 22 removed. FIG. 17 corresponds to a sectional view taken along line XVII-XVII of FIG. 18. FIG. 19 is a schematic view illustrating the bottom face of electrolytic capacitor 1E of FIG. 17 with sealing member 22 used for sealing. In second direction D2 of cathode lead frame 210, which intersects first direction D1 at an angle of approximately 90°, a dimension (width) of cathode connection parts 212 is smaller than a dimension (width) of cathode mount 211 and a dimension (width) of cathode terminal 213. It is to be noted here that cathode connection parts 212 are constituted by two parts. Thus, the dimension (width) of cathode connection parts 212 is a sum of the dimensions (widths) of these two parts in second direction D2.

An outline of cathode terminal 213 has an approximately protruding shape. Hence, cathode terminal 213 has one projection 213A according with the protruding shape. Meanwhile, an outline of cathode mount 211 has an approximately recessed shape. When seen from the bottom face of electrolytic capacitor 1E, cathode mount 211 partly overlaps with projection 213A.

Figure 20:
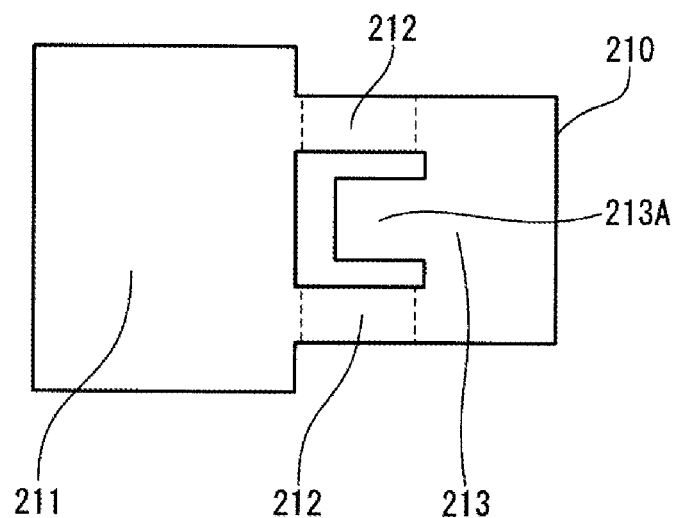
FIG. 20 is a developed view illustrating the cathode lead frame according to the fifth exemplary embodiment.

FIG. 20 is a developed view illustrating cathode lead frame 210 before bending. Cathode terminal 213 has a projection portion. And a pair of cathode connection parts 212, which each have small width, are extended from respective two sites sandwiching projection 213A in cathode terminal 213 to be connected to cathode mount 211. In other words, cathode connection parts 212 are formed by providing a hole having a recess toward cathode mount 211 in a region between cathode mount 211 and cathode terminal 213 of cathode lead frame 210.

Sixth Exemplary Embodiment

Figure 21:
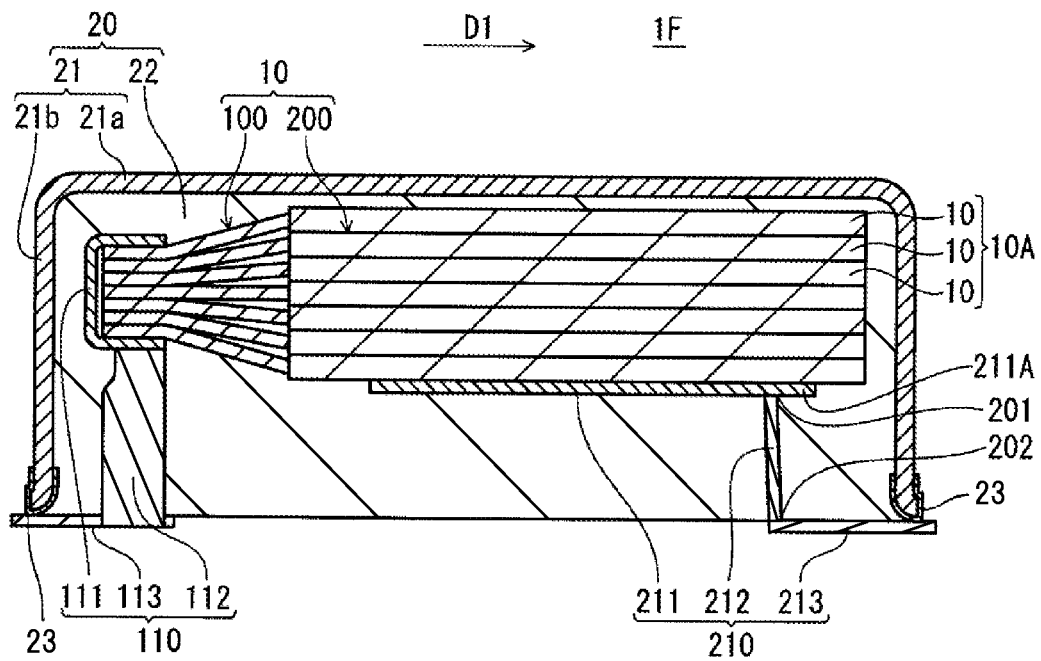
FIG. 21 is a partly sectional view schematically illustrating an electrolytic capacitor including an insulation member between a metal case and each of terminals according to a sixth exemplary embodiment of the present disclosure.

FIG. 21 is a partly sectional view schematically illustrating electrolytic capacitor 1F according to a sixth exemplary embodiment of the present disclosure. Electrolytic capacitor 1F includes metal case 21 and also includes insulation member 23 between metal case 21 and anode terminal 113 as well as between metal case 21 and cathode terminal 213.

Since metal case 21 does not transmit outside air or moisture, electrolytic capacitor 1F is unsusceptible to outside air or moisture. Thus, electrolytic capacitor 1F has very high resistance to deterioration. Shortest distance L1 between capacitor element 10 and a surface of sealing member 22 at the opening end of metal case 21 is preferably as great as possible. Shortest distance L1 may be determined appropriately with a view of meeting a demand for miniaturization of electrolytic capacitor 1F. Further, shortest distance L2 between top plate 21a of metal case 21 and capacitor element 10 may be also determined appropriately with the view of meeting the demand for miniaturization of electrolytic capacitor 1F.

It is to be noted that the way of ensuring insulation between metal case 21 and anode terminal 113 as well as between metal case 21 and cathode terminal 213 is not limited to the present exemplary embodiment. It is also to be noted that electrolytic capacitor 1F may be structurally similar to that of any of the first through fifth exemplary embodiments except for the above differences.

Examples of a material for metal case 21 include aluminum, titanium, tantalum, iron, copper, zinc, nickel, molybdenum, and tungsten, and the like. These materials may be used in combination, or a composite material of a plurality of materials may be used.

A material for insulation member 23 is not particularly limited, and examples of the material include resins (epoxy resin, phenol resin, polyester resin, melamine resin, polyimide resin, and others), ceramics (aluminum oxide, zirconium dioxide, aluminum nitride, silicon nitride, and others), rubbers (styrene-butadiene rubber, isoprene rubber, butadiene rubber, ethylene propylene rubber, urethane rubber, silicone rubber, fluororubber, and others), glass, and heat-resistant paper, to name a few. These materials may be used in combination, or a composite material of a plurality of materials may be used.

Insulation members 23 may be, for example, resin films respectively covering at least areas of a case 21 opening edge that correspond to terminals 113, 213, respectively. Alternatively, insulation members 23 may be, for example, resin films respectively covering respective areas of anode terminal 113 and cathode terminal 213 that face the opening edge of case 21. The resin films may be resin tapes, resin coatings, or a resin cap covering the opening edge of case 21. A thickness of the resin film is not particularly limited and ranges, for example, from 1 μm to 300 μm, inclusive.

Seventh Exemplary Embodiment

Figure 22:
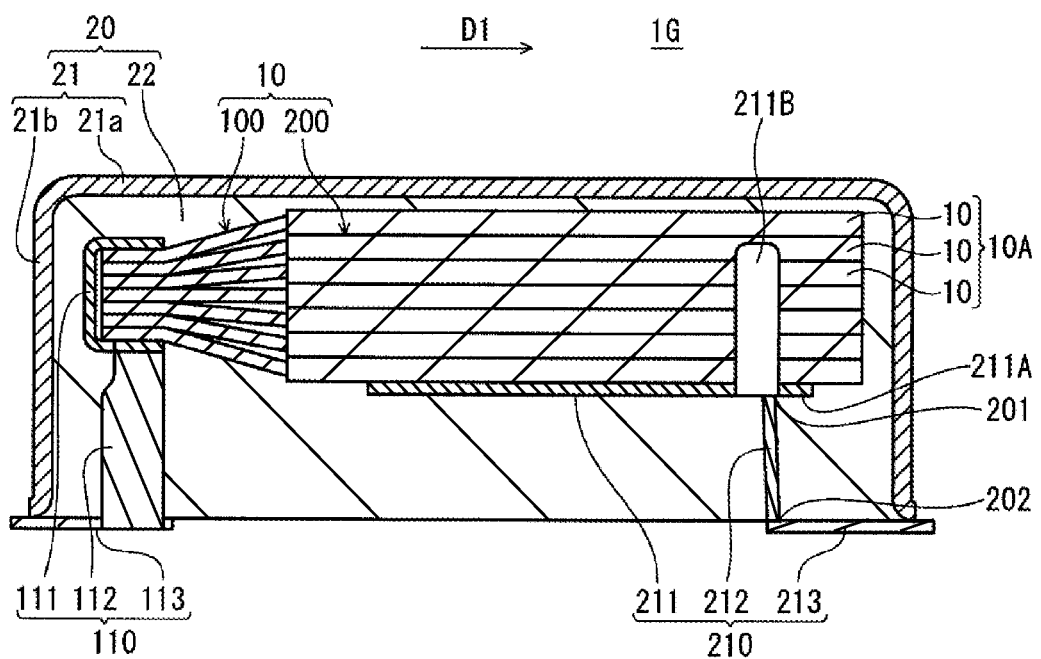
FIG. 22 is a partly sectional view schematically illustrating an electrolytic capacitor including a cathode lead frame with side wall parts according to a seventh exemplary embodiment of the present disclosure.

FIG. 22 is a partly sectional view schematically illustrating electrolytic capacitor 1G, in section of exterior member 20, according to a seventh exemplary embodiment of the present disclosure. Cathode mount 211 of cathode lead frame 210 of electrolytic capacitor 1G includes side wall parts 211B that are disposed along peripheral side surfaces of capacitor elements 10. Side wall parts 211B serve to position capacitor elements 10 and contribute to increase of an area of connection between cathode mount 211 and cathode parts 200 of capacitor elements 10. The peripheral side surfaces of capacitor elements 10 of electrolytic capacitor 1G are surfaces along a stacking direction of the plurality of capacitor elements 10 forming layered body 10A. A pair of side wall parts 211B are provided respectively along a fifth principal surface and a sixth principal surface of each of capacitor elements 10.

Figure 23:
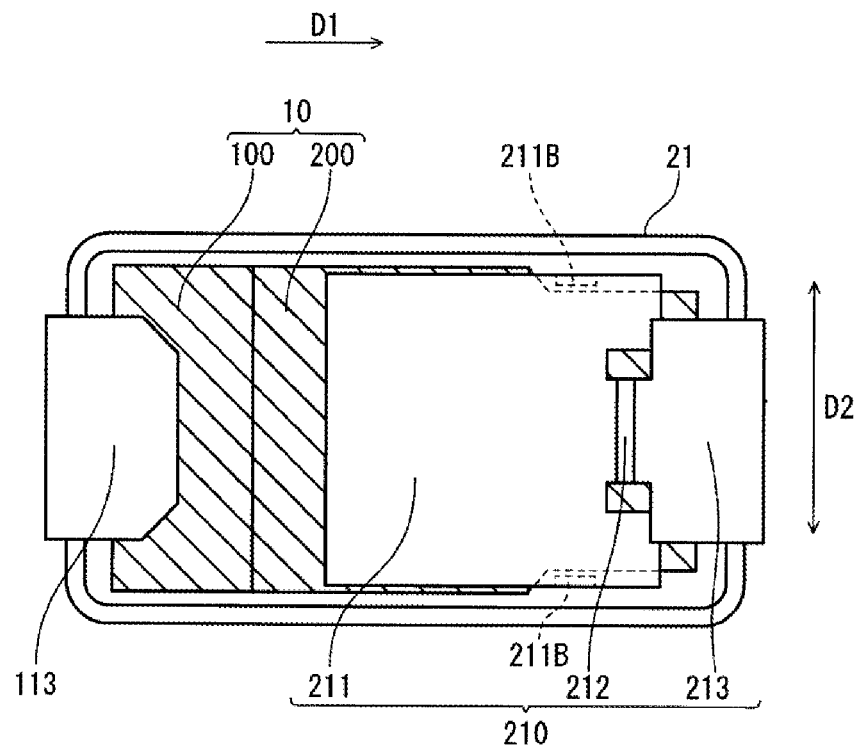
FIG. 23 is a schematic view illustrating a lead frame, and a capacitor element, as seen from a bottom face of the electrolytic capacitor according to the seventh exemplary embodiment with a sealing member removed.

FIG. 23 is a schematic view illustrating lead frames 110, 210 and capacitor element 10, as seen from a bottom face of electrolytic capacitor 1G according to the seventh exemplary embodiment with sealing member 22 removed. Cathode part 200 of each of capacitor elements 10 has a slightly recessed portion that is disposed at near respective positions of the pair of side wall parts 211B.

Figure 24:
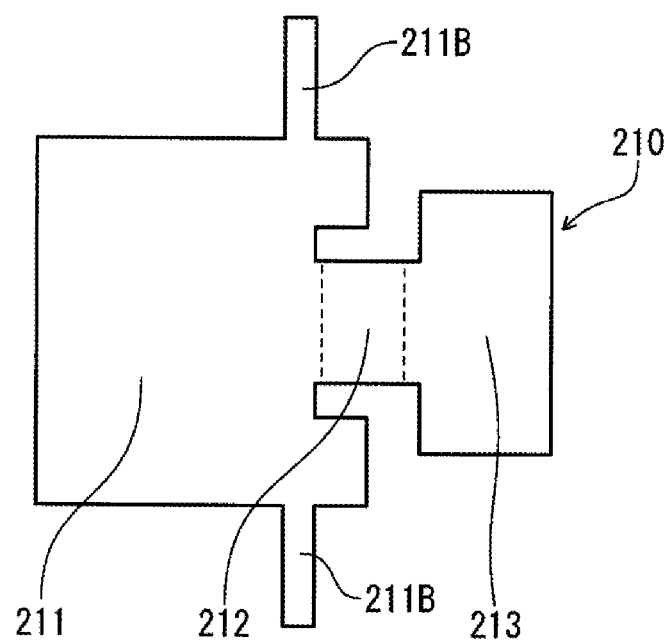
FIG. 24 is a developed view illustrating the cathode lead frame according to the seventh exemplary embodiment.

FIG. 24 is a developed view illustrating cathode lead frame 210 according to the seventh exemplary embodiment. Cathode lead frame 210 is structurally similar to cathode lead frame 210 of the first exemplary embodiment except for providing side wall parts 211B.

It is to be noted that electrolytic capacitor 1G may be structurally similar to that of any of the first through sixth exemplary embodiments except for the above difference.

Eighth Exemplary Embodiment

Figure 25:
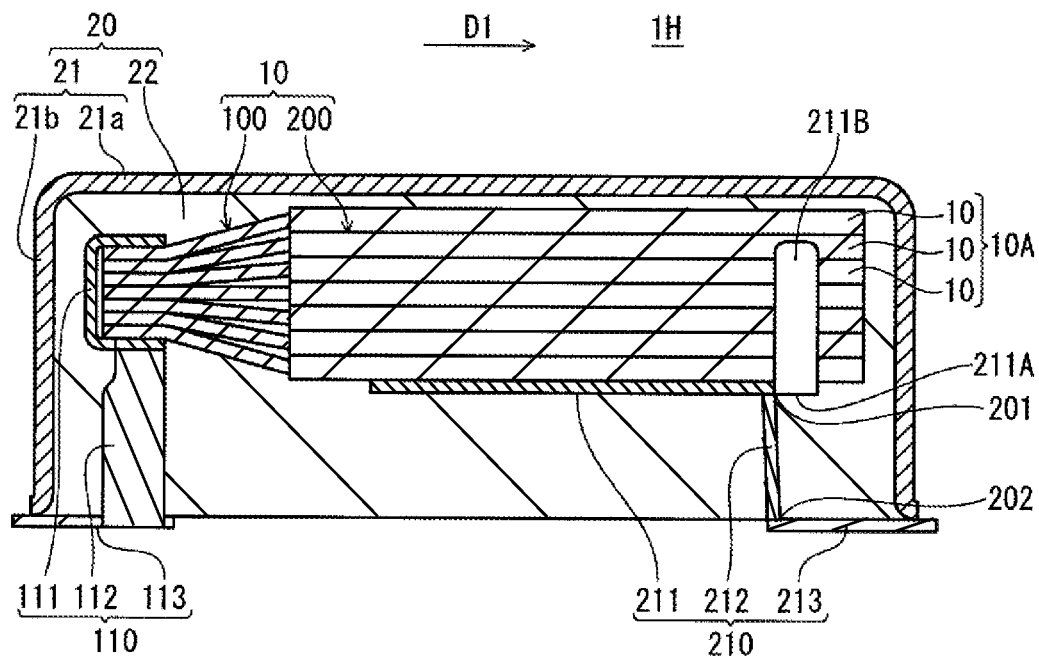
FIG. 25 is a partly sectional view schematically illustrating an electrolytic capacitor including a cathode lead frame with side wall parts that are respectively connected to projections according to an eighth exemplary embodiment of the present disclosure.

FIG. 25 is a partly sectional view schematically illustrating electrolytic capacitor 1H, in section of exterior member 20, according to an eighth exemplary embodiment of the present disclosure. Electrolytic capacitor 1H includes side wall parts 211B that are respectively connected to projections 211A of cathode lead frame 210. It is to be noted that each of side wall parts 211B may be at least partly connected to projection 211A. A pair of side wall parts 211B are provided respectively at cathode-terminal-side endmost parts of first-direction edges of cathode mount 211 to extend respectively along a fifth principal surface and a sixth principal surface of each of capacitor elements 10.

Figure 26:
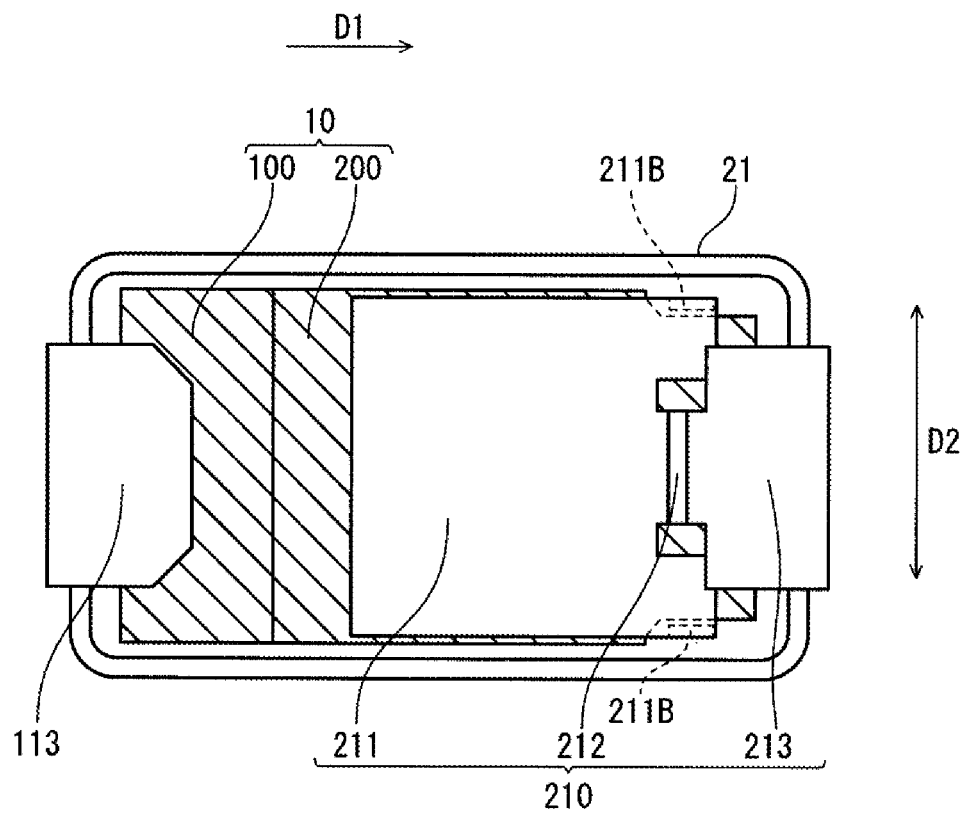
FIG. 26 is a schematic view illustrating a lead frame, and a capacitor element, as seen from a bottom face of the electrolytic capacitor according to the eighth exemplary embodiment with a sealing member removed.

FIG. 26 is a schematic view illustrating lead frames 110, 210 and capacitor element 10, as seen from a bottom face of electrolytic capacitor 1H according to the eighth exemplary embodiment with sealing member 22 removed. Cathode part 200 of each of capacitor elements 10 has a slightly recessed portion that is disposed at near respective positions of the pair of side wall parts 211B. However, since the slightly recessed portion of cathode part 200 is less recessed than that of the seventh exemplary embodiment, cathode part 200 maintains its large size. In other words, a space for accommodating side wall part 211B is designed to be minimized. Hence, electrolytic capacitor 1H according to the present exemplary embodiment can have larger capacitance than electrolytic capacitor 1G according to the seventh exemplary embodiment.

Figure 27:
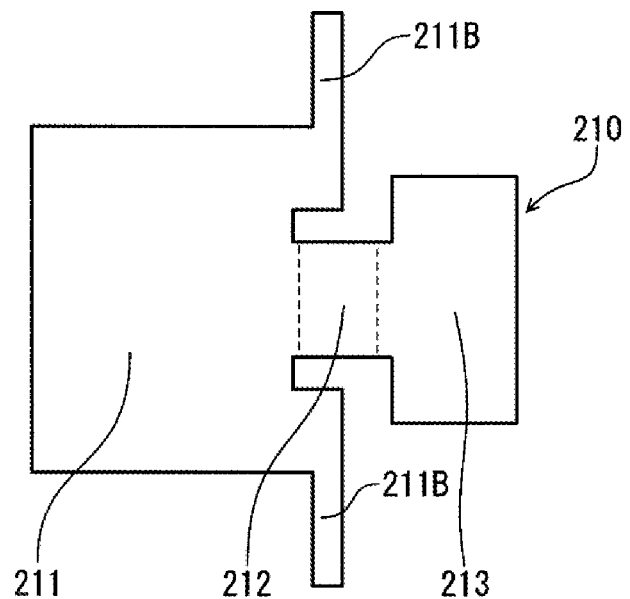
FIG. 27 is a developed view illustrating the cathode lead frame according to the eighth exemplary embodiment.

FIG. 27 is a developed view illustrating cathode lead frame 210 according to the eighth exemplary embodiment. Cathode lead frame 210 is structurally similar to cathode lead frame 210 of the seventh exemplary embodiment, except that the pair of side wall parts 211B are provided respectively at endmost parts of cathode terminal 213 side of first-direction outer edges of the pair of projections 211A.

It is to be noted that electrolytic capacitor 1H may be structurally similar to that of the third exemplary embodiment except for the above difference.

A further description is provided next of capacitor element 10 that is common to the exemplary embodiments.
(Capacitor Element)

Figure 28:
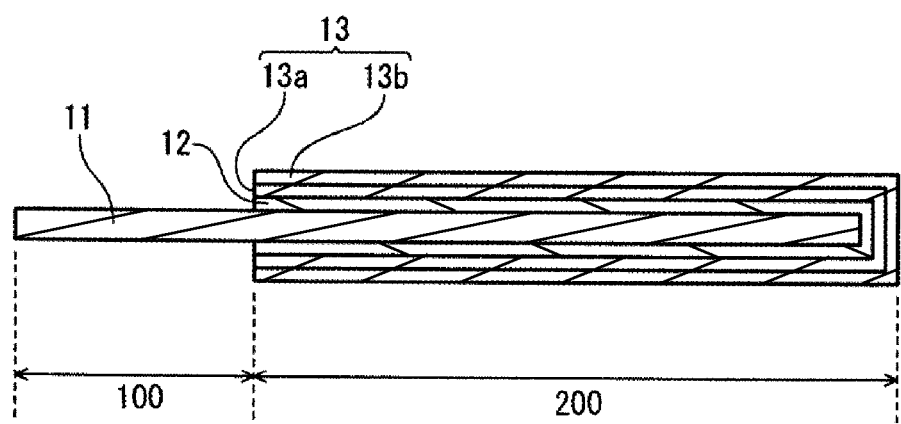
FIG. 28 is a sectional view schematically illustrating the capacitor element according to each of the exemplary embodiments of the present disclosure.

Capacitor element 10 includes anode part 100 and cathode part 200. As illustrated in FIG. 28, anode part 100 of capacitor element 10 is formed by anode body 11. Cathode part 200 includes anode body 11, dielectric layer 12 formed on at least a part of a surface of anode body 11, and cathode layer 13 formed on at least a part of a surface of dielectric layer 12. Cathode layer 13 includes solid electrolyte layer 13a formed on at least the part of dielectric layer 12, and cathode lead-out layer 13b formed on at least a part of solid electrolyte layer 13a. Such capacitor element 10 has the shape of, for example, a sheet or a flat plate.

(Anode Body)

Anode body 11 includes foil (metal foil) containing valve metal as a conductive material, or a porous sintered body containing valve metal. An anode wire is implanted straight from the porous sintered body. The anode wire is used for connection with anode lead frame 110. Examples of the valve metal include titanium, tantalum, aluminum, and niobium, and the like. Anode body 11 may include one kind of valve metal or may include more than or equal to two kinds of valve metal. A thickness of anode body 11 formed of the metal foil is not particularly limited and ranges, for example, from 15 μm to 300 μm, inclusive. A thickness of anode body 11 formed of the porous sintered body is not particularly limited and ranges, for example, from 15 μm to 5 mm, inclusive.

(Dielectric Layer)

Dielectric layer 12 is formed when, for example, the surface of anode body 11 is anodized by an anodizing treatment or the like. For this reason, dielectric layer 12 can include an oxide of the valve metal. When, for example, aluminum is used as the valve metal, dielectric layer 12 can include $Al_2O_3$. It is to be noted that dielectric layer 12 is not limited to this and has only to be any layer that functions as a dielectric.

(Cathode Layer)

Cathode layer 13 includes, for example, solid electrolyte layer 13a covering dielectric layer 12, and cathode lead-out layer 13b covering solid electrolyte layer 13a.

Solid electrolyte layer 13a has only to cover at least the part of dielectric layer 12 and may be formed to cover the whole surface of dielectric layer 12.

Examples that can be used for solid electrolyte layer 13a include a manganese compound and a conductive polymer. Usable examples of the conductive polymer include polypyrrole, polyaniline, polythiophene, polyacetylene, and their derivatives. Solid electrolyte layer 13a containing the conductive polymer can be formed, for example, by at least one of chemical polymerization or electrolytic polymerization of monomers, which are raw materials, on dielectric layer 12. Alternatively, solid electrolyte layer 13a can be formed by application of a solution including the dissolved conductive polymer or a dispersion liquid including the dispersed conductive polymer to dielectric layer 12.

Cathode lead-out layer 13b has only to cover at least the part of solid electrolyte layer 13a and may be formed to cover the whole surface of solid electrolyte layer 13a. Cathode lead-out layer 13b includes, for example, a carbon layer and a metal paste layer (including, for example, silver) formed on a surface of the carbon layer. The carbon layer is formed of a composition including a conductive carbon material such as graphite. The metal paste layer is formed of, for example, a composition including silver particles and resin. It is to be noted that cathode lead-out layer 13b is not limited to this structure and has only to structurally have a current collection function.

Although the present disclosure has been described by way of the preferred exemplary embodiments at present, such disclosure should not be construed as limiting. Various variations and modifications will become clearly apparent to those skilled in the art to which the present disclosure pertains upon reading the above disclosure. Therefore, the scope of the appended claims should be construed to encompass all those variations and modifications without departing from the true spirit and scope of the present disclosure.

What is claimed is:

1. A solid electrolytic capacitor comprising:
   a capacitor element including an anode part and a cathode part;
   an anode lead frame and a cathode lead frame, each of the anode lead frame and the cathode lead frame being connected to the capacitor element; and
   an exterior member covering the capacitor element, a part of the anode lead frame, and a part of the cathode lead frame, wherein:
   the cathode lead frame is integrally formed from a single sheet of metal so that the cathode lead frame includes a cathode mount, a cathode connection part connected to the cathode mount, and a cathode terminal connected to the cathode connection part, the cathode part being mounted on the cathode mount,
   the cathode lead frame bends in one direction at a first boundary between the cathode mount and the cathode connection part, and the cathode lead frame further bends in another direction at a second boundary between the cathode connection part and the cathode terminal, and
   at least one of the cathode mount or the cathode terminal has a projection at an edge of the at least one of the cathode mount or the cathode terminal, the edge being at a side close to the cathode connection part, the projection projecting in a first direction along which the anode part and the cathode part are aligned.

2. The solid electrolytic capacitor according to claim 1, wherein a width of the cathode connection part is smaller than at least one of a width of the cathode mount or a width of the cathode terminal, the width being a dimension in a second direction intersecting the first direction.

3. The solid electrolytic capacitor according to claim 1, wherein:
   the cathode mount has the projection,
   the cathode mount further includes a side wall part that is at least partly connected to the projection, and
   the side wall part is disposed along a peripheral side surface of the capacitor element.

4. The solid electrolytic capacitor according to claim 1, wherein an outline of the cathode mount in planer view has a protruding shape or a recessed shape.

5. The solid electrolytic capacitor according to claim 1, wherein an outline of the cathode terminal in planer view has a protruding shape or a recessed shape.

6. The solid electrolytic capacitor according to claim 1, wherein:
   the exterior member includes a metal case having an opening and a sealing member filling the metal case, the capacitor element being housed in the metal case and covered by the sealing member; and
   at least a part of the cathode terminal is exposed from the sealing member at a position close to the opening of the metal case.

7. The solid electrolytic capacitor according to claim 6, wherein a shortest distance between the capacitor element and a surface of the sealing member is more than or equal to 5% of a depth of the metal case measured from the opening, the surface of the sealing member being a surface close to the opening of the metal case.

8. A solid electrolytic capacitor comprising:
   a capacitor element including an anode part and a cathode part;
   an anode lead frame and a cathode lead frame, each of the anode lead frame and the cathode lead frame being connected to the capacitor element; and an exterior member covering the capacitor element, a part of the anode lead frame, and a part of the cathode lead frame, wherein:

the cathode lead frame includes a cathode mount, a cathode connection part connected to the cathode mount, and a cathode terminal connected to the cathode connection part, the cathode part being mounted on the cathode mount, the cathode lead frame bends in one direction at a first boundary between the cathode mount and the cathode connection part, and the cathode lead frame further bends in another direction at a second boundary between the cathode connection part and the cathode terminal, an outline of at least one of the cathode mount or the cathode terminal in planer view has a recessed shape, at least one of the first boundary or the second boundary is disposed in a recess of the recessed shape, and the at least one of the cathode mount or the cathode terminal has a projection at an edge of the at least one of the cathode mount or the cathode terminal, the edge being at a side close to the cathode connection part, the projection projecting in a first direction along which the anode part and the cathode part are aligned.

9. The solid electrolytic capacitor according to claim 8, wherein the cathode lead frame is integrally formed from a single sheet of metal.

10. The solid electrolytic capacitor according to claim 8, wherein a width of the cathode connection part is smaller than at least one of a width of the cathode mount or a width of the cathode terminal, the width being a dimension in a second direction intersecting the first direction.

11. The solid electrolytic capacitor according to claim 8, wherein:

the cathode mount has the projection, the cathode mount further includes a side wall part that is at least partly connected to the projection, and the side wall part is disposed along a peripheral side surface of the capacitor element.

12. The solid electrolytic capacitor according to claim 8, wherein:

the exterior member includes a metal case having an opening and a sealing member filling the metal case, the capacitor element being housed in the metal case and covered by the sealing member; and at least a part of the cathode terminal is exposed from the sealing member at a position close to the opening of the metal case.

13. The solid electrolytic capacitor according to claim 12, wherein a shortest distance between the capacitor element and a surface of the sealing member is more than or equal to 5% of a depth of the metal case measured from the opening, the surface of the sealing member being a surface close to the opening of the metal case.

14. A solid electrolytic capacitor comprising:

a capacitor element including an anode part and a cathode part;

an anode lead frame and a cathode lead frame, each of the anode lead frame and the cathode lead frame being connected to the capacitor element; and an exterior member covering the capacitor element, a part of the anode lead frame, and a part of the cathode lead frame, wherein:

the cathode lead frame includes a cathode mount, a cathode connection part connected to the cathode mount, and a cathode terminal connected to the cathode connection part, the cathode part being mounted on the cathode mount, the cathode lead frame bends in one direction at a first boundary between the cathode mount and the cathode connection part, and the cathode lead frame further bends in another direction at a second boundary between the cathode connection part and the cathode terminal, an outline of at least one of the cathode mount or the cathode terminal in planer view has a protruding shape, a protrusion of the protruding shape is disposed between two connecting parts in at least one of the first boundary or the second boundary, and the at least one of the cathode mount or the cathode terminal has a projection at an edge of the at least one of the cathode mount or the cathode terminal, the edge being at a side close to the cathode connection part, the projection projecting in a first direction along which the anode part and the cathode part are aligned.

15. The solid electrolytic capacitor according to claim 14, wherein the cathode lead frame is integrally formed from a single sheet of metal.

16. The solid electrolytic capacitor according to claim 14, wherein a width of the cathode connection part is smaller than at least one of a width of the cathode mount or a width of the cathode terminal, the width being a dimension in a second direction intersecting the first direction.

17. The solid electrolytic capacitor according to claim 14, wherein:

the cathode mount has the projection, the cathode mount further includes a side wall part that is at least partly connected to the projection, and the side wall part is disposed along a peripheral side surface of the capacitor element.

18. The solid electrolytic capacitor according to claim 14, wherein:

the exterior member includes a metal case having an opening and a sealing member filling the metal case, the capacitor element being housed in the metal case and covered by the sealing member; and at least a part of the cathode terminal is exposed from the sealing member at a position close to the opening of the metal case.

19. The solid electrolytic capacitor according to claim 18, wherein a shortest distance between the capacitor element and a surface of the sealing member is more than or equal to 5% of a depth of the metal case measured from the opening, the surface of the sealing member being a surface close to the opening of the metal case.

* * * * *